(12) United States Patent
Boutcher et al.

(10) Patent No.: US 8,649,491 B1
(45) Date of Patent: Feb. 11, 2014

(54) SYSTEM AND METHOD FOR REAL-TIME GEOGRAPHICAL CALL DISPLAY OF AUTOMATIC CALL DISTRIBUTOR CALLS

(75) Inventors: James K Boutcher, Omaha, NE (US); Michael Joseph Parmeley, Omaha, NE (US)

(73) Assignee: West Corporation, Omaha, NE (US)

( * ) Notice: Subject to any disclaimer, the term of this patent is extended or adjusted under 35 U.S.C. 154(b) by 1415 days.

(21) Appl. No.: 12/277,734

(22) Filed: Nov. 25, 2008

(51) Int. Cl.
*H04M 3/42* (2006.01)
*H04M 3/523* (2006.01)

(52) U.S. Cl.
USPC ............ 379/201.04; 379/201.06; 379/201.07; 379/201.08; 379/265.02; 379/265.09; 379/912; 455/414.1; 455/457

(58) Field of Classification Search
USPC .......................................................... 455/457
See application file for complete search history.

(56) References Cited

U.S. PATENT DOCUMENTS

| | | | |
|---|---|---|---|
| 6,055,307 A * | 4/2000 | Behnke et al. | 379/265.14 |
| 7,961,866 B1 * | 6/2011 | Boutcher et al. | 379/265.01 |
| 8,009,822 B1 * | 8/2011 | Boutcher et al. | 379/265.11 |
| 2003/0013461 A1 * | 1/2003 | Mizune et al. | 455/456 |
| 2008/0037763 A1 * | 2/2008 | Shaffer et al. | 379/266.01 |
| 2008/0232571 A1 * | 9/2008 | Millard et al. | 379/207.12 |
| 2009/0154685 A1 * | 6/2009 | McConnell et al. | 379/265.03 |
| 2010/0128867 A1 * | 5/2010 | Vendrow et al. | 379/266.01 |

\* cited by examiner

*Primary Examiner* — Harry Hong

(57) ABSTRACT

In a call center, a caller's geographical position may be mapped together with a geographical position of a call agent allocated to handle the call. A map may display tags depicting the respective positions of the caller and the call agent with a visual link indicating the call connection. The call agent may be selected dependent on the relative proximity to the caller.

19 Claims, 4 Drawing Sheets

SYSTEM AND METHOD FOR REAL-TIME GEOGRAPHICAL CALL DISPLAY OF AUTOMATIC CALL DISTRIBUTOR CALLS

FIELD OF THE INVENTION

This invention relates to an Automatic Call Distributor (ACD) and to systems and methods for handling calls to the ACD.

BACKGROUND OF THE INVENTION

Automatic Call Distributors are used in telephony systems, in particularly call centers, to route calls from end-users to call agents. When a call is received, the ACD determines the most appropriate agent to handle the call and routes the call to the agent accordingly. The ACD may make use of rule based systems and information provided by the caller, for example through an Interactive Voice Response (IVR) system. Typically, the rules based systems aim to utilize the call agents most efficiently, by matching calls to the skill sets of the agents. Managerial and administrative decisions of the call centers may be based on the available information.

What is required is a system, method and computer readable medium that may provide an enhanced display of call data.

SUMMARY OF THE INVENTION

In one aspect of the disclosure, there is provided a call system comprising an Automatic Call Distributor (ACD) and a display. The ACD may be configured to receive a call from a caller, determine a geographic location of the caller, allocate a call agent to the call, and determine a geographic location of the call agent. The display may be configured to display a geographic relationship between the caller and the agent.

In one aspect of the disclosure, there is provided a method for displaying call data relating to a call between a caller and a call agent. The method comprises mapping a position of the caller, mapping a position of the call agent, and displaying a link between the position of the caller and the position of the call agent.

In one aspect of the disclosure, there is provided a computer-readable medium comprising computer-executable instructions for execution by a first processor and a second processor in communication with the first processor, that, when executed cause the first processor to determine a geographical position of a caller, and allocate a call agent to the caller dependent on the relative position between the allocated call agent and the caller. The instructions, when executed, also cause the second processor to generate a display of call data comprising an indication of the call agent allocated to the caller.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
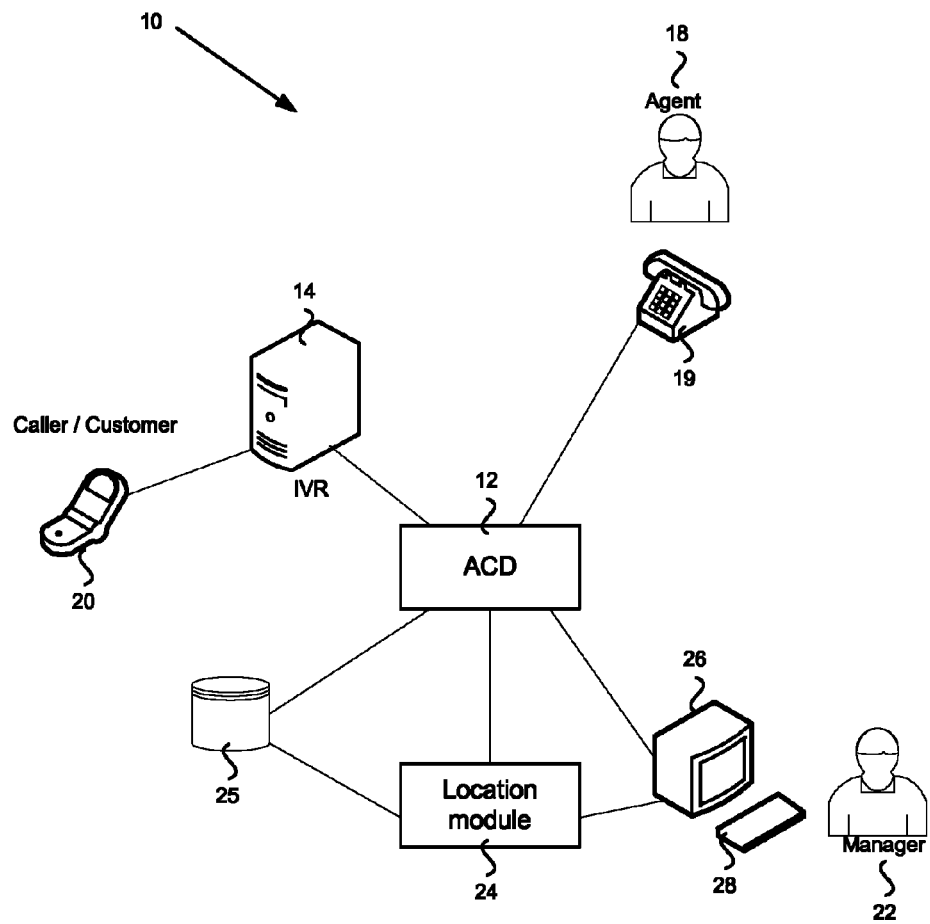
FIG. 1 illustrates a call system in accordance with an embodiment of the disclosure.

A call system in accordance with an embodiment of the disclosure is illustrated in FIG. 1. In the call system 10, an Automatic Call Distributor (ACD) 12 processes incoming calls from callers 20. Typically, the ACD 12 receives the calls via an Interactive Voice Response (IVR) 14 but may receive the calls directly or through other channels (not shown). The ACD 12 uses skills based routing to select an agent 18 and routes the call to the selected agent.

A call center manager 22 may manage calls and review call data through the ACD 12. The ACD 12 may interface with a database 25 that receives and stores call data about agents, callers, calls, IVR parameters etc. Through the ACD 12 the call center manager 22 may process data required to monitor and manage the call center system 10.

Modern call centers, in particular call centers utilizing modern ACDs allow call agents to be geographically distributed rather than being constrained to one central location. In accordance with an embodiment of the disclosure, the call center system 10 may include a location module 24 that manages location data for the call agents and callers. Whilst illustrated as a discrete component in FIG. 1, the location module 24 may form a component of the ACD 12. The call center 10 may also include an interface having a visual display 26. In one embodiment, the visual display 26 may form part of a computer console 28 of the manager 22 and/or may include a large screen display (not shown) that is viewable within a call center that houses a plurality of call agents. Supervisors may have visual displays that allow them to view call data for agents within the supervisor's group. In addition, remote call agents may have a personal console that allows the call agent to view the display, or a partial representation of the display, as will be described in more detail below. The visual display 26 may include a map, shown in more detail in FIG. 2. The map 30 includes icons or tags 31 that provide an indication of the geographic location of the call agents 18. The call agent tag 31 may be depicted with a particular symbol, such as the square symbol shown in FIG. 2. The call agent tag 31 may also display additional details (not shown) such as whether the call agent is active, awaiting call allocation, offline, etc. For active agents, details of the call may also be displayed, including a caller ID, current call duration, and any additional known information such as topic of call, phone number dialed by the caller etc. Further call agent details displayed for all agents may include the skill set of the agent, current utilization level, etc. Such details may be retrieved from the database 25. A call agent tag 31 may be presented as a hyperlink that links to further information about the call agent.

In one embodiment, the geographic location of an agent may be plotted using location data generated by location module 24 that is stored and retrieved from the database 25. For example, agents may be assigned a workstation 19 with an associated phone number. The database 25 may maintain a mapping of phone number area codes to their corresponding latitude/longitude values, thereby enabling a geographic location of the workstation to be plotted. The method for determining the location of the call agent may be performed statically, as described above, by referencing data in the database 25. Alternatively, dynamic methods for determining the call agent location, such as deriving positional data from call identifiers, paging signals, mobile phone tracking signals etc may be apparent to a person skilled in the art. The specific technique for determining the call agent position is not considered to be relevant, provided that the agent position, or an approximation of the agent position may be determined. Other static or dynamic methods for determining the call agent location may be developed in the future and all techniques for determining the call agent position are intended to be encompassed within this disclosure.

When a call is received into the call center 10, systems within the call center 10 such as the ACD 12, IVR 14, the real-time switch 24 or other suitable components may be configured to determine a geographic location of the caller from available information such as an Automatic Number Identification (ANI), i.e. caller ID, or other suitable identifier. The ANI or other caller ID may be referred to the database 25 to determine a latitude/longitude position of the caller, which may determine the caller position from information in the ANI such as an area code. Once the position is determined, the caller location may be plotted on the map 30. Known details, for example determined by the IVR, may also be associated with the caller and plotted on the map adjacent a caller tag 32. The call agent tag 32 may be depicted with a particular symbol, such as the circle symbol shown in FIG. 3. As for the call agent position, the caller position may be determined by any technique apparent to the person skilled in the art and all techniques for determining the caller position, or an approximation of the caller position, are intended to be included herein.

The ACD 12 allocates an agent 18 to the call based on various criteria. These criteria may include caller dependent parameters learned through an IVR or they may be agent dependent parameters determined by analysis and data systems associated with the ACD 12. Typical parameters may include a skill set of the agent and/or a current utilization of an agent.

Figure 2:
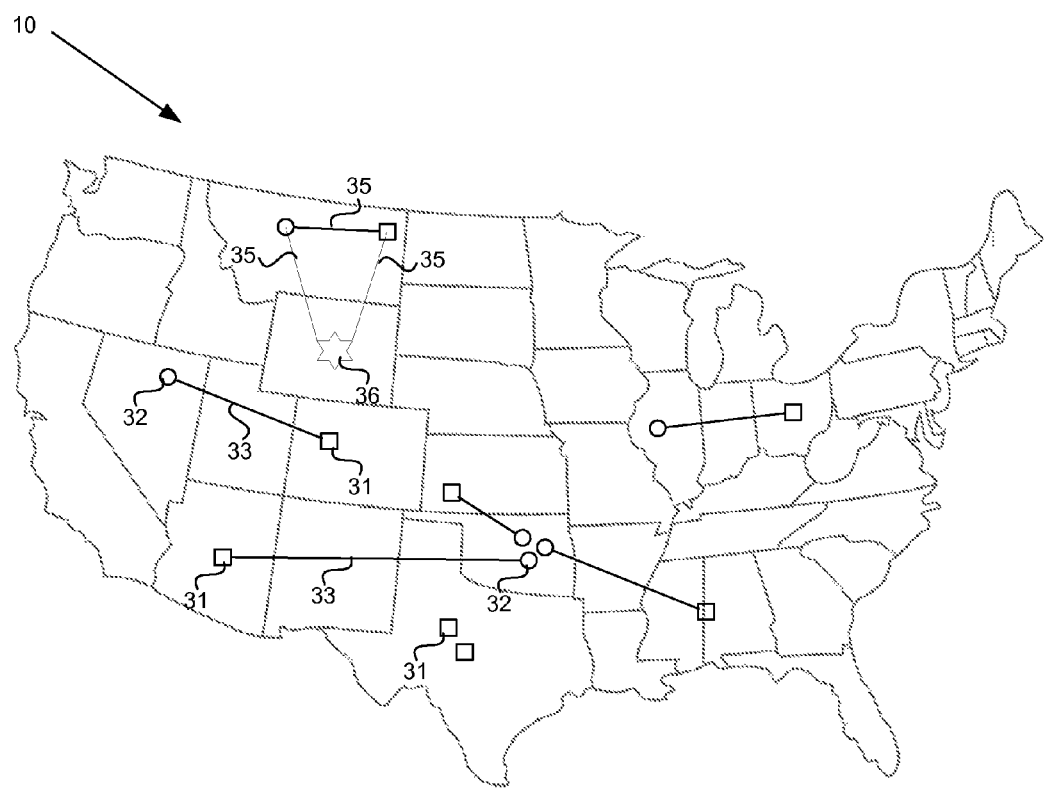
FIG. 2 illustrates a map generated and displayed by the call system.
Figure 3:
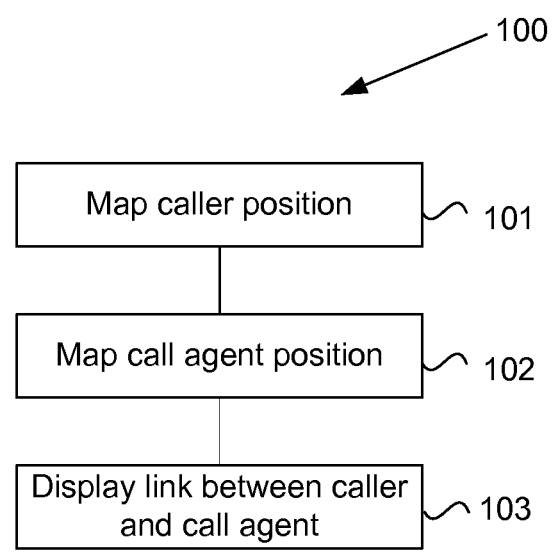
FIG. 3 illustrates a method for displaying call data.

A method for providing a call data display on the display 26 will now be described with reference to FIGS. 1 and 2 and to the flowchart 100 of FIG. 3. At step 101, a position of the caller is mapped on the map 30. A position of the call agent allocated to the call is then mapped at step 102. Once the caller and call agent have been mapped on the map 30 with appropriate tags 31, 32, a geographical relationship between the position of the caller and the position of the call agent can then be displayed (step 103). For example, an agent 31 and caller 32 may be associated on the map by a visual link 33 or similar icon.

The display of the agent tags 31, caller tags 32 and links 33 may be provided in various ways. For example, agent tags 31 may be represented with a specific symbol and/or color which may change depending on the status of the agent. Similarly, caller tags 32 may have specific symbols and/or colors. The use of dedicated symbols and/or colors allows a viewer of the display to quickly comprehend which of two linked correspondents is the agent and which is the caller. In one embodiment, at least one of the color or symbol used to indication a call connection between an agent tag 31 and a caller tag 32 may be the same in order to emphasize the connection.

In one embodiment, a supervisor, manager or other user may be able to manipulate the map 30 in a variety of ways. For example, the map may be manipulated to display only callers or only agents. In one embodiment, all agents may be displayed on the map irrespective of their current status. Alternatively, all online agents may be displayed. In one embodiment, only active agents having a currently connected call are shown on the map together with a link to the associated caller. When the map returns to a full display, the associations between the callers and agents may be re-displayed.

The call link 33 may be presented as a hyperlink that, when selected, presents real-time call data statistics regarding the call. The real-time call data statistics may be collected by the ACD 12 and stored in the database 25 for retrieval when the hyperlink 33 is selected. Call data statistics may include length of call, a path taken by the caller through the IVR 14, survey responses received by the call agent, or other relevant data.

In one embodiment, a caller may be simultaneously serviced by multiple call agents, such as a call agent and a supervisor or manager. In this case, links 35 on the map 30 may be drawn between each call participant in a network arrangement, or in some particular form, such as a loop, that highlights the multi-agent call. The links 35 may include different coloring or the agent and caller symbols may be unique and indicate the multi-agent call. Alternatively or in addition, a supervisor tag 36 may include its own unique coloring and symbol.

In one embodiment, the call agent 18 may be provided with an interface that displays the map 30. The map displayed to the call agent 18 may be a partial representation of the map 30. For example, the map 30 provided to the call agent may include only call data for that particular agent, such as a geographic relationship for each of the callers that the call agent has serviced for a defined period, e.g. within that day or shift, etc. Alternatively or in addition, the map 30 provided to the call agent may include data relating to a particular caller, e.g. a current caller, that shows geographic relationships between the current caller and other agents that have been serviced by the call center. In an embodiment where the call center manager, supervisor or other additional call participant is included in the call, the map 30 provided to the call agent may include the geographic relationship of the additional call participant(s).

As described above, the ACD 12 allocates a call agent 18 to a caller 20 based on various rules based criteria. In one embodiment, the rules based criteria may be modified by the location module 24 to select the call agent dependent on the relative position between the call agent and the caller. The ACD and/or location module 24 may aim to minimize the distance between the call agent and the caller while still maintaining other criteria such as the skill set of the agent selected and/or the utilization levels of the various call agents 18. In one embodiment, the call agent may be selected so that the time zone of the call agent is the same, or as close as possible to the time zone of the caller. Selection of the call agent to be in proximity of the caller, or at least in a near time zone, may facilitate an easier communication between the call agent and the caller. By visually displaying the call connection, call agents, managers and supervisors may have greater awareness of the caller's environment and may therefore be better placed to address the caller's needs.

Figure 4:
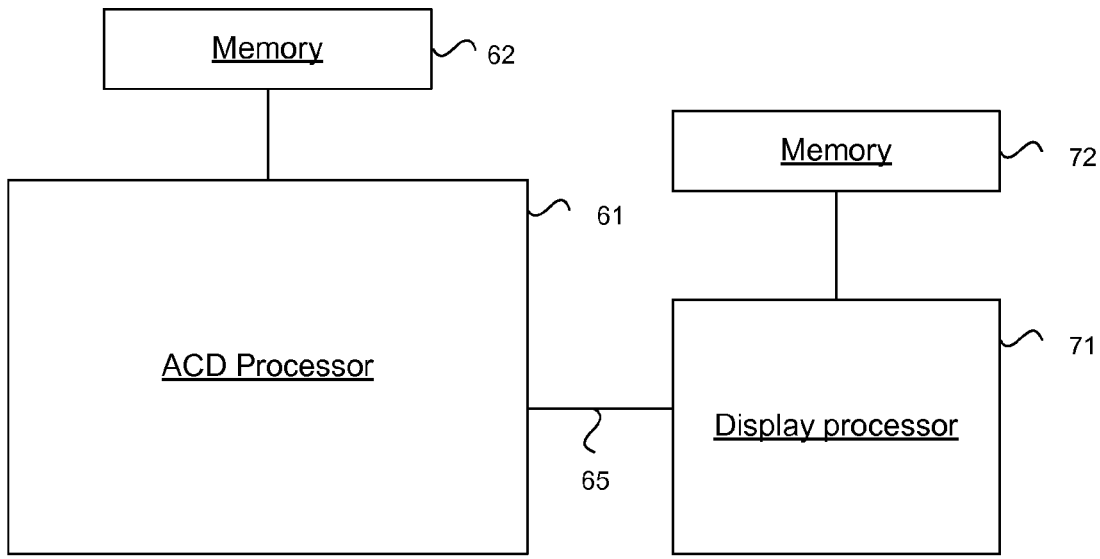
FIG. 4 illustrates a processor of an ACD and a display generating processor.

In one embodiment, the ACD 12 may include a processor 61 operatively associated with at least one memory 62, as shown in FIG. 4. The memory 62 may store instructions that are executable on the processor 61. An instruction set that may be executed on the processor 61 may cause the processor 61 to determine a caller position, determine a position for each of the available call agents, and select a call agent dependent on the relative proximity of the call agent to the caller.

Figure 5:
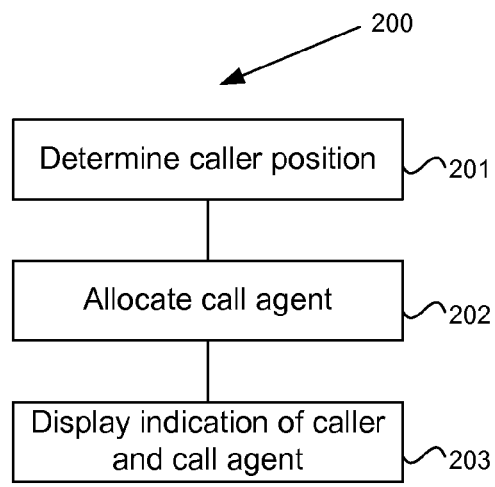
FIG. 5 illustrates an instruction set that may be executed on the processors of FIG. 4.

In one embodiment, the ACD processor 61 may communicate with a second processor 71, such as a processor of the manager console 28 through a suitable communications link 65. The manager console processor 71 may be operatively associated with a memory 72. Together, the ACD processor 61 and the processor 71 may execute an instruction set 200, as depicted in FIG. 5, that causes the ACD processor 61 to determine a geographical position of a caller (step 201) and allocate a call agent to the caller dependent on the relative position between the allocated call agent and the caller (step 202). Positional data may be passed to the second processor 71 which may then generate a display of call data (step 203) including an indication of the call agent allocated to the caller. The call data may include a mapped link showing a connection between the respective positions of the caller and the allocated call agent.

While the processors are depicted as single entities, a person skilled in the art will readily understand that the processors may be provided as multiple and in a distributed form.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A call system comprising:
    an Automatic Call Distributor for a call center at a first geographic location that utilizes a plurality of geographically distributed call agents at locations remote from the call center, the Automatic Call Distributor configured to:
        receive a call from a caller;
        determine a geographic location of the caller;
        allocate a remote call agent to the call; and
        determine a geographic location of the remote call agent that is independent of the location of the call center; and
    a display configured to display a geographic relationship between the caller and the agent, wherein the display is separate from a telecommunications device of the allocated call agent.

2. The call system according to claim 1 wherein the display comprises a map configured to plot the geographic relationship between the caller and the call agent.

3. The call system according to claim 2 wherein the map is configured to display the geographic location of a plurality of call agents.

4. The call system according to claim 2 wherein the geographic relationship comprises a call agent symbol indicating the geographic location of the call agent, a caller symbol indicating the geographic location of the caller and a visual link connecting the call agent symbol and the caller symbol.

5. The call system according to claim 4 wherein at least one of the call agent symbol, caller symbol and visual link provides a hyperlink to call data relating to the call.

6. The call system according to claim 1 further comprising a database that stores positional data.

7. The call system according to claim 6 wherein the positional data comprises a mapping between an area code and a geographical position.

8. The call system according to claim 7 wherein the Automatic Call Distributor is configured to determine an area code of the caller.

9. The call system according to claim 8 wherein the Automatic Call Distributor is configured to reference the database using the area code of the caller to determine the geographic location of the caller.

10. The call system according to claim 6 wherein the positional data comprises geographical positions for a plurality of call agents.

11. The call system according to claim 1 wherein the Automatic Call Distributor is configured to allocate the call agent to the call dependent on the geographical position of the call agent relative to the caller.

12. A method for displaying call data relating to a call between a caller and a remote call agent of a call center at a first geographic location that utilizes a plurality of geographically distributed call agents at locations remote from the call center, the method comprising:
    mapping, by at least one programmed processor, a position of the caller;
    mapping, by the at least one programmed processor, a position of the remote call agent that is independent of the location of the call center; and
    displaying on a display that is separate from a telecommunications device of the allocated call agent, by the at least one programmed processor, a link between the position of the caller and the position of the remote call agent.

13. The method according to claim 12 further comprising:
    determining online call agents;
    selecting the call agent from the online call agents; and
    allocating a selected call agent to the caller.

14. The method according to claim 13 further comprising:
    determining the position of the caller;
    determining the positions of the online call agents; and
    selecting the call agent dependent on the relative position between the caller and the selected call agent.

15. The method according to claim 12 wherein mapping the position of the call agent comprises retrieving a stored position of the call agent from a database.

16. The method according to claim 12 wherein mapping the position of the caller comprises:
    determining an area code of the caller; and
    retrieving a position associated with the area code from a database.

17. The method according to claim 12 comprising:
    generating a map;
    displaying a call agent symbol on the map, the call agent symbol indicating the geographic location of the call agent;
    displaying a caller symbol on the map, the caller symbol indicating the geographic location of the caller;
    displaying a visual link that connects the call agent symbol and the caller symbol.

18. A non-transitory computer-readable medium comprising computer-executable instructions for execution by a first processor and a second processor in communication with the first processor, that, when executed:
    cause the first processor to:
        determine a geographical position of a caller; and allocate a call agent to the caller dependent on the relative position between the allocated call agent and the caller; and cause the second processor to:

generate a display of call data comprising an indication of the call agent allocated to the caller;

display a map comprising:

the geographical position of the caller;

the geographical position of the call agent; and a visual link between the geographical position of the caller and the geographical position of the allocated call agent, wherein the display of call data and the display of the map is on a display that is separate from a telecommunications device of the allocated call agent.

19. The non-transitory computer readable medium according to claim 18 comprising instructions, that, when executed, cause the first processor to reference a database to determine positions of online call agents.

* * * * *